Jan. 28, 1958
C. M. FRYE
2,821,412
SELF-SEALING COUPLINGS
Filed Jan. 8, 1954
2 Sheets-Sheet 1
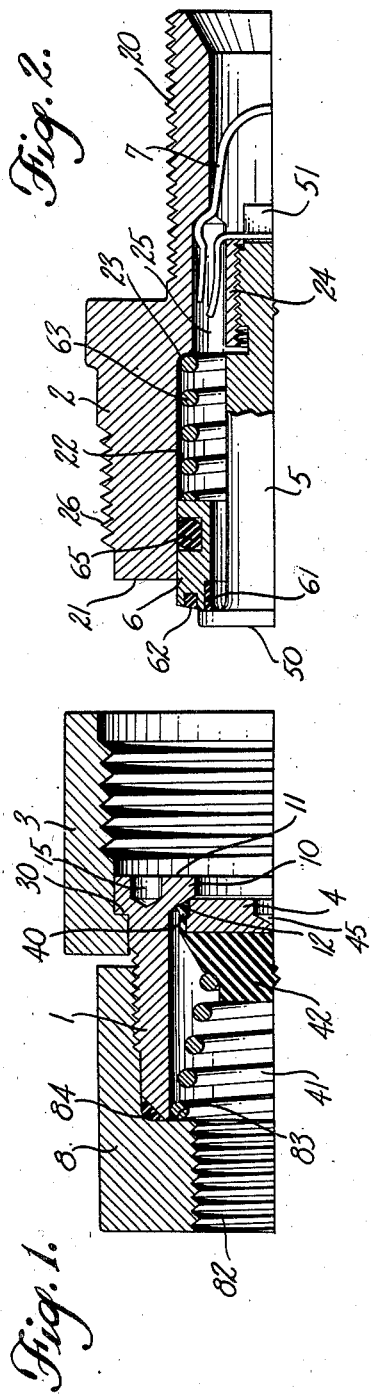
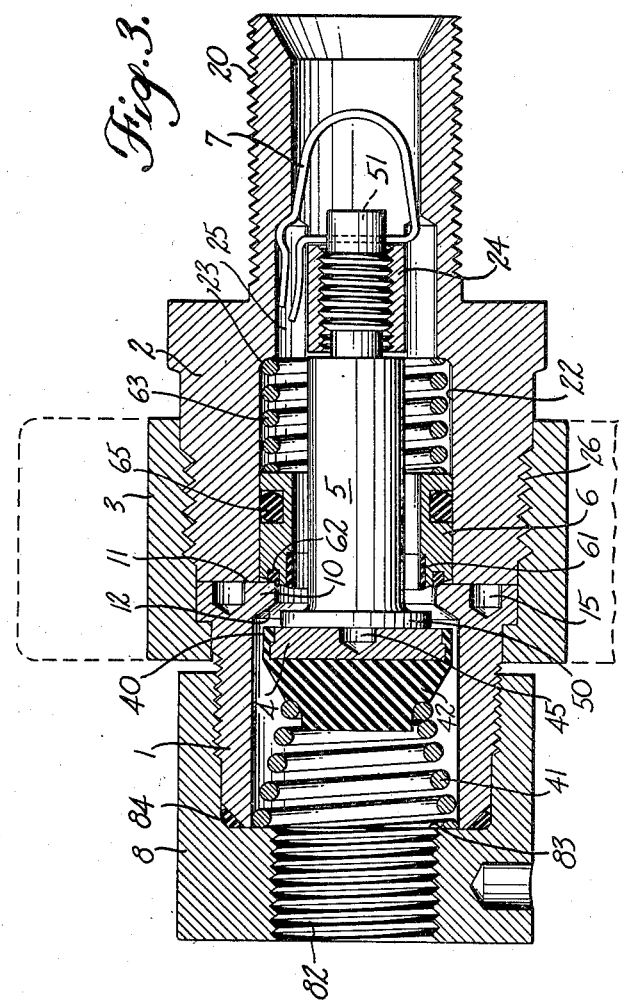
INVENTOR.
COLIN MICHAEL FRYE
BY
Reynolds, Beach & Christensen
ATTORNEYS INVENTOR.
COLIN MICHAEL FRYE
BY
Reynolds, Beach & Christensen
ATTORNEYS United States Patent Office 2,821,412
Patented Jan. 28, 1958

2,821,412
SELF-SEALING COUPLINGS

Colin M. Frye, Longlevens, England, assignor to Dowty Hydraulic Units Limited, Cheltenham, England, a British company Application January 8, 1954, Serial No. 403,027

Claims priority, application Great Britain April 13, 1953

3 Claims. (Cl. 284—18)

It is desirable at times to interrupt a hydraulic line or the like which is at the time filled with fluid, sometimes at very appreciable pressure, and to reconnect the two termini thereof, all without appreciable loss of fluid or pressure and without appreciable entrapment of air during reconnection.

It is the primary object of the present invention to provide a coupling device of a nature that will enable the accomplishment of that end, and specifically one which will be so constructed as to provide an effective seal while the parts are being uncoupled, while they are separated, and during and after their recoupling, and in which there shall be no appreciable entrapment of air during the operation of recoupling.

It is a further object of the invention to provide a coupling device having the advantages and capabilities indicated, which shall be of simple construction and relatively inexpensive, and in which in particular the sealing is dependent upon three deformable sealing rings located at special spacings and in special dispositions relative to one another, which, however, may be deformed only to a given and predetermined extent, their further deformation being then terminated and limited by metal-to-metal contact between the principal parts of the coupling device.

Inasmuch as the device depends for successful operation upon precision of spacing in or relative disposition of the several parts, as will appear more fully hereinafter, it is another object of this invention to provide such a coupling device in which some adjustment in these critical dimensions may be accomplished readily, and the parts may be held in proper adjustment by readily engageable and disengageable means.

With these and similar objects in mind, as will appear more fully hereinafter, the present invention comprises the novel combination and arrangement of the parts of a coupling and the relative disposition of such parts to one another, all as is shown in a typical form in the accompanying drawings, and as will be more fully explained and claimed hereinafter.

Figure 1 is a half-sectional view of a first sleeve constituting one terminal and its associated parts, and Figure 2 is a similar view of a second sleeve constituting the other terminal and its associated parts. In each figure the parts are shown in their positions of separation.

Figure 3 is an axial sectional view showing the two termini joined in operative relationship, and with the cooperating parts of each terminal shifted from their positions of separation to open a through passage for the fluid.

Figure 4:
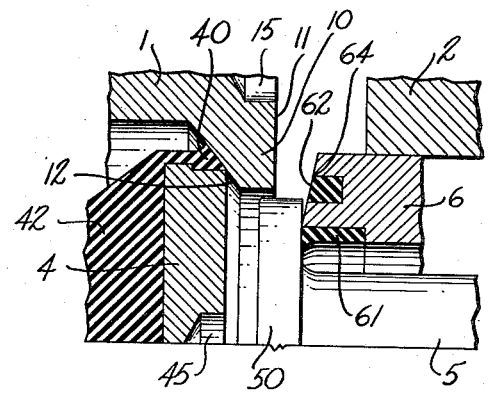
Figure 5:
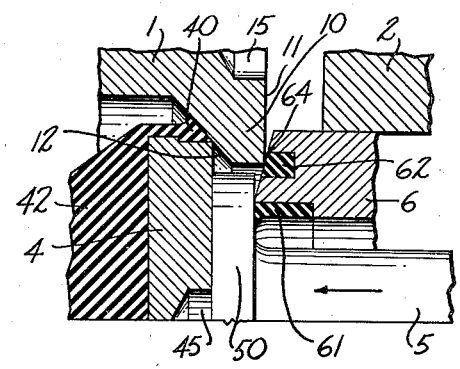
Figure 6:
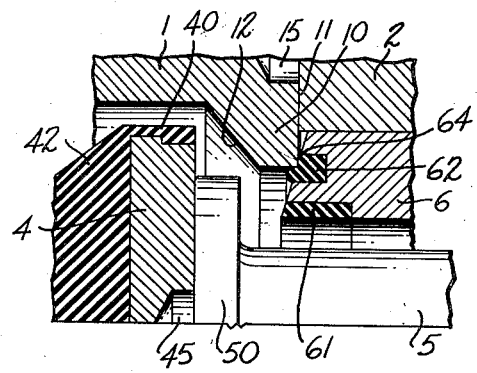

Figure 4 is an enlarged detail view showing the relative position of parts, including particularly the sealing rings, when the two internally sealed termini are about to engage. Figure 5 is a similar view showing the two termini about to seal externally while still internally sealed, and Figure 6 is a similar view showing the two parts of the coupling sealed externally and unsealed internally. This latter view corresponds to the position of parts in Figure 3.

The coupling includes two separable sleeves, and a means to couple them end to end, and the valve mechanism wherein the invention resides more particularly, includes a fixed valve seat member and a movable valve member for each sleeve, the two specified members being engageable and disengageable by reciprocation of the movable valve member axially with relation to the fixed valve seat member. Spring means urge the members into engagement. The fixed valve seat member in each sleeve projects towards the movable valve member of the other sleeve, and when the two sleeves are coupled, each such projecting valve seat member holds the valve member which it engages off the latter's valve seat member, in opposition to its spring means. One of the cooperating valve members and valve seat members of each sleeve, has a radially planar valve contact surface, and its cooperating member has a frusto-conical valve contact surface, which surfaces interengage when the sleeves are separated, although they are spaced apart and unseated when the sleeves are coupled. One of the valve contact surfaces, whether on the planar member or the frusto-conical member, in each instance, has a hard circular terminal shoulder which, being aligned axially with the cooperating valve contact surface, engages the latter about a circle to effect final seating, but in addition has a terminal cylindrical rim of resiliently deformable sealing material alongside the hard shoulder. This resiliently deformable rim is exposed at its end and on one side to define an annular corner, disposed closer than the hard shoulder to the cooperating valve contact surface of the cooperating member, so that this deformable rim engages with the cooperating valve contact surface before the hard shoulder engages therewith, and so forms a preliminary seal, but the force of the spring means presses the two members together, and forces the hard shoulder into engagement with the cooperating valve contact surface, while still leaving the deformed rim also in contact therewith as a seal, as the sleeves are separated.

The sleeve 1, hereinafter designated the first sleeve, is one of the two separable sleeves referred to above, and a valve disk 4 is the movable valve member for this sleeve, seating about its peripheral circle, under the influence of the compression spring 41, upon a fixed valve seat member 12, upon an inwardly directed flange 10 of the sleeve 1. A deformable rim 40, surrounding the valve contact surface or circle of the disk 4, first engages the cooperating frusto-conical valve contact surface 12 of the fixed valve seat member, and seals as it is deformed under spring pressure.

The other similar fixed valve seat member and movable valve member for the second sleeve 2 are formed of the flange 50 at the end of a stem 5, fixed within the sleeve 2 in a manner to be described later, and the sleeve-like valve member 6, with its deformable rim 61 and the adjoining hard shoulder just outwardly thereof. Here the movable valve member 6 is frusto-conical and the fixed valve seat member 50 is planar. The two are urged together by the compression spring 63 when the sleeves 1 and 2 are separated.

The first sleeve 1 is provided with means for securing it as one terminus of a conduit (not shown), which is to be kept full of hydraulic fluid or the like. As a means to this end there may be provided a threaded-on coupler 8 internally threaded at 82 for securement upon the hydraulic conduit, and internally shouldered at 83 to constitute a seat for the compression spring 41 referred to above. A seal at 84 insures against leakage at the juncture between the sleeve 1 and the coupler 8.

The outer face of flange 10 is finished to define a mating plane, usually by squaring its end surface 11. The opposite face of the flange 10 is beveled, as indicated at 12, to constitute the valve seating surface referred to above.

The valve disk 4 is of a sufficiently large size to seat about its periphery on and in metal-to-metal contact with the beveled seating surface 12, close to the mating plane. Externally it is provided with the sealing ring 40 of deformable material, referred to above, which when undeformed, as shown, for example, in Figure 3 or in Figure 6, is coplanar with the face of the valve disk 4 which is near the mating plane at 11, so that when the valve disk 4 is urged toward the seating surface 12 and toward the mating plane 11, the sealing ring 40 will first engage the beveled surface 12 and will be deformed thereby until its deformation is terminated by the metal-to-metal contact between the peripheral edge of the valve disk 4 and the beveled seating surface 12. The material at 42 behind the valve disk 4 may be of the same material as the sealing ring at 40, it being simple to form it that way, and constitutes a seat for the spring 41, whereby the latter, reacting from the shoulder 83, or in effect from the first sleeve 1, urges the valve disk 4 against its seat at 12.

The second sleeve 2 is suitably formed, as by being threaded at 20, for securement as the opposite terminus of the fluid-filled line at the point of disconnection, and its end 21, facing the mating plane 11, is formed complementally to the end face 11 at the mating plane, to seat thereon when the two sleeves 1 and 2 are end-abutted, as they are in Figure 3. Internally the sleeve 2 is formed with a chamber 22 terminating in a shoulder 23, and beyond that a spider 24 is internally threaded. The stem 5, referred to above, is threaded within the spider 24 for axial adjustment, and is held at some given or predetermined axial disposition therein and relative to the second sleeve 2, being fixed in position by such means as the spring device or clip 7, received in one of a number of apertures 25 past the spider 24 and in a notch 51 of the stem 5.

The outwardly flanged head 50 at the opposite end of the stem 5 faces the valve disk 4. This head 50 is of a size to pass through the inwardly directed flange 10 of the first sleeve 1 and it projects by a small but definite amount, as determined by the axial adjustment of the stem, past the end surface 21 of the second sleeve 2, which when abutted against the surface 11 defines the mating plane. Because of this projection of the head 50 this head will engage the valve disk 4 and will unseat the latter and its sealing ring 40 by the time the two sleeves 1 and 2 are abutted at their respective mating surfaces 11 and 21.

This axial approach of the sleeves 1 and 2 is effected by any suitable coupling means, as for example, the internally threaded coupler sleeve 3, swiveled at 30 upon the first sleeve 1, and threading upon the threads 26 of the second sleeve 2.

The third sleeve 6 is slidably received and sealed at 65 within the chamber 22 and is urged toward the mating plane by the compression spring 63, already mentioned, seating upon the shoulder 23 and reacting from the latter against the inner end of the third sleeve 6. This third sleeve 6 is of such dimensions that its outer periphery lies outside the head 50 of the stem, but its inner periphery lies inside the head 50, and so its end, as a valve will engage and be stopped by seating upon the latter as a seat. An inner annular sealing ring 61 at the interior of the sleeve 6 in position such that it engages the head 50 and is deformed by the seating of the sleeve 6 upon the head 50. In addition, the projecting end of the sleeve 6 is annularly grooved or recessed, and an outer sealing ring 62, also of deformable material, is received therein in position to engage the inner periphery of the flange 10 at the mating plane 11.

Referring now to Figures 4, 5 and 6, it will be seen that the projecting or outer end of the third sleeve 6 is beveled or frusto-conical in shape, and that the two sealing rings which it carries, the inner one at 61 and the outer one at 62, are preferably beveled in the same fashion and to the same slope, so that a portion of the inner sealing ring 61 projects slightly ahead of the adjoining inner peripheral edge of this end of the third sleeve 6, and in similar fashion a part of the outer sealing ring 62 projects ahead of the outer edge 64 of the recess within which the ring 62 is received. Also, as has already been mentioned, the seating face of the valve disk 4 and of its peripheral sealing ring 40 are flush, and consequently with relation to the beveled or frusto-conical valve seating surface 12 the sealing ring 40 engages somewhat ahead of engagement of the outer periphery of the metal portion of the valve disk 4.

In Figure 4 wherein the parts are shown separated, and about to reengage, the sealing ring 40 about the valve disk 4 is shown engaged with the seating surface 12 and deformed by the pressure of the spring 41 urging the valve disk 4 to metal-to-metal contact with the seating surface 12. In similar fashion the inner sealing ring 61 of the third sleeve 6 is shown seated upon and deformed by the head 50 by the force of spring 63 until this deformation is stopped by metal-to-metal contact of the inner periphery of the sleeve 6 against the head. The sealing ring 62 is unstressed.

Now, as the coupler sleeve 3 draws the sleeves 1 and 2 axially together, the head 50 engages the valve disk 4 as it is shown doing in Figure 5. At that instant, because of the relative dimensions of the parts and the extent of the projection of the head 50, the sealing rings 40 and 61 both remain seated and deformed, yet the outer sealing ring 62 is now in engagement with the inner periphery of the flange 10 at the mating plane 11. Continued approach of the sleeves 1 and 2 deforms the outer sealing ring 62 and insures a tight seal at the lip of the flange 10, because of the pressure of spring 63, until its deformation is stopped by metal-to-metal contact between the edge 64 and the mating surface 11 of the flange 10. This seal at 62 insures against loss of fluid from the space between the sleeve 6 and the valve disk 4. Still further approach of the sleeves 1 and 2, as in Figure 6, unseats the valve disk 4 and its sealing ring 40 and also unseats the inner peripheral edge of the third sleeve 6 and its inner sealing ring 61 from the head 50. Fluid is admitted to the space between the sleeve 6 and the valve disk 4, past either or both the sealing rings 40 and 61, but because of the prior seating of 64 on the surface 11 and deformation of the sealing ring 62 no loss of fluid occurs. A through passage for fluid is provided past the edge of the valve disk 4, through the flange 10 and past the head 50, and finally through the sleeve 6 and through the apertures 25 past the spider 24, although flow is not necessarily in the sense indicated.

The stem 5 is threaded at the end opposite its head 50 into the spider 24, in order that the extent of projection of its head 50 may be varied by small increments. When the correct adjustment is obtained, the stem is held in this position of adjustment by such means as the spring clip 7, the ends whereof are received within the appropriate one of the several apertures 25 and a transverse portion of which may be engaged within the notch 51 in the end of the stem.

It is believed it will be apparent that the parts, when in the position of Figure 4, provide a thorough seal for each separate terminal of the hydraulic line. When parts are in the position of Figure 5 in the process of reengagement, the seals are still effective to seal off each individual terminal, yet even now the outer sealing ring 62 is beginning to become an effective seal, and does become an effective seal prior to any separation of the valve disk 4 and its sealing ring 40 from the seating surface 12, and prior to any unseating of the third sleeve 6 and its inner sealing ring 61 from the head 50. In separating the reverse is true. The seals at 40 and at 61 are thoroughly reestablished prior to any unsealing at 62.

The two short blind bores 15 formed in the first sleeve 1 from its end surface 11 are provided for the reception of a suitable tool during screwing of the first sleeve 1 into the coupler 8. The short blind bore 45 in the centre of the disk 4 is provided to enable the disk 4 to be held in a central position during the moulding of the sealing ring 40 thereon.

I claim as my invention:

1. In a coupling, two interconnected sleeves capable of being separated, and valve means in each of said sleeves including a fixed valve seat member, a movable valve member engageable with said fixed valve seat member and reciprocable axially of its sleeve toward and away from said fixed valve seat member, and spring means urging said movable valve member toward said fixed valve seat member, the fixed valve seat member in one sleeve being positioned, when the sleeves are coupled together, to engage the movable valve member in the other sleeve and to hold it disengaged from its fixed valve seat member in opposition to its spring means, one of said members in each sleeve having a radially planar valve contact surface and its cooperating member having a frustoconical valve contact surface engageable with said radially planar valve contact surface when said sleeves are separated, and one of said valve contact surfaces having a hard circular terminal shoulder aligned axially of its sleeve with its cooperating valve contact surface and engageable about a circle with such cooperating valve contact surface, and further having a terminal cylindrical rim of resiliently deformable sealing material alongside said hard shoulder exposed at its end and on one side to define an annular corner, said corner being disposed closer than said hard shoulder to the cooperating valve contact surface of the other member and engageable therewith before said hard shoulder, said rim being narrow radially and deformable by the force of said spring means pressing one of said members against the other when said sleeves are separated to enable said hard shoulder to engage the cooperating valve contact surface following sealing engagement and deformation of said sealing material rim.

2. Valve mechanism in a coupling sleeve comprising a valve member and a valve seat member one whereof is reciprocable lengthwise of the coupling sleeve relative to the other into and out of engagement with each other, and spring means urging said members toward engagement, one of said members having a radially planar valve contact surface and the other member having a frustoconical valve contact surface, such two contact surfaces being interengageable, and one of said valve contact surfaces having a hard circular terminal shoulder aligned axially of its sleeve with the other of said valve contact surfaces and engageable about a circle with such other of said valve contact surfaces, and further having a terminal cylindrical rim of resiliently deformable sealing material alongside said hard shoulder exposed at its end and on one side to define an annular corner, said corner being disposed closer than said hard shoulder to the valve contact surface of the other member and engageable therewith before said hard shoulder, said rim being narrow radially and deformable by the force of said spring means pressing said members into engagement to enable said hard shoulder to engage its cooperating valve contact surface following sealing engagement and deformation of said sealing material rim.

3. Valve mechanism in a coupling sleeve comprising a valve member and a valve seat member one whereof is reciprocable lengthwise of the coupling sleeve relative to the other into and out of engagement with each other, and spring means urging said members toward engagement, said members having radially relatively convergent valve contact surfaces, the valve contact surface of one of said members having a hard circular shoulder aligned axially of the coupling sleeve with the valve contact surface of the other of said members and engageable about a circle with such valve contact surface of such other member, and further having a cylindrical rim of resiliently deformable sealing material alongside said hard shoulder exposed at its end and on one side to define an annular corner, said corner being disposed closer than said hard shoulder to the valve contact surface of such other member and engageable therewith before said hard shoulder, said rim being narrow radially and deformable by the force of said spring means pressing said members into engagement to enable said hard shoulder to engage the valve contact surface of such other member following sealing engagement and deformation of said sealing material rim.

References Cited in the file of this patent

UNITED STATES PATENTS

| | | |
|---|---|---|
| 2,208,286 | Berger | July 16, 1940 |
| 2,311,239 | Main et al. | Feb. 16, 1943 |
| 2,498,104 | Brandau et al. | Feb. 21, 1950 |
| 2,505,093 | Brock | Apr. 25, 1950 |
| 2,505,245 | Hollerith | Apr. 25, 1950 |
| 2,648,548 | Scheiwer | Aug. 11, 1953 |
| 2,739,374 | Kaiser | Mar. 27, 1956 |